(12) United States Patent
Van Riel et al.

(10) Patent No.: US 7,739,554 B2
(45) Date of Patent: Jun. 15, 2010

(54) METHOD AND SYSTEM FOR AUTOMATIC RESOLUTION AND DISPATCHING SUBSCRIPTION SERVICE

(75) Inventors: Henrl Han Van Riel, Nashua, NH (US);
Scott Crenshaw, Dunstable, MA (US)

(73) Assignee: Red Hat, Inc., Raleigh, NC (US)

( * ) Notice: Subject to any disclaimer, the term of this patent is extended or adjusted under 35 U.S.C. 154(b) by 334 days.

(21) Appl. No.: 11/680,583

(22) Filed: Feb. 28, 2007

(65) Prior Publication Data

US 2008/0209279 A1 Aug. 28, 2008

(51) Int. Cl.
*G06F 11/00* (2006.01)
(52) U.S. Cl. .......................................... 714/48; 714/46
(58) Field of Classification Search ................. 714/47, 714/48, 46, 37, 38, 56, 57
See application file for complete search history.

(56) References Cited

U.S. PATENT DOCUMENTS

| | | | |
|---|---|---|---|
| 6,260,048 B1 * | 7/2001 | Carpenter et al. | 707/104.1 |
| 6,760,862 B1 | 7/2004 | Schreiber et al. | |
| 7,124,327 B2 * | 10/2006 | Bennett et al. | 714/38 |
| 7,305,592 B2 * | 12/2007 | Neiger et al. | 714/48 |
| 7,475,135 B2 * | 1/2009 | Bantz et al. | 709/224 |
| 7,516,362 B2 | 4/2009 | Connelly et al. | |
| 2004/0120250 A1 * | 6/2004 | Langevin et al. | 370/216 |
| 2004/0172574 A1 | 9/2004 | Wing et al. | |
| 2006/0005084 A1 * | 1/2006 | Neiger et al. | 714/47 |
| 2006/0074764 A1 * | 4/2006 | Schmitt et al. | 705/26 |
| 2006/0085792 A1 | 4/2006 | Traut | |
| 2006/0224930 A1 * | 10/2006 | Bantz et al. | 714/48 |
| 2007/0271428 A1 | 11/2007 | Atluri | |
| 2008/0276131 A1 * | 11/2008 | Bantz et al. | 714/47 |

FOREIGN PATENT DOCUMENTS

WO 9715009 A1 4/1997

OTHER PUBLICATIONS

Humphreys, John. Scaramella, Jed. Policy-Based Automation for Dynamic Virtual Environments. Jan. 2007. IDC Information and Data. pp. 5,7.*
van Riel et al., U.S. Appl. No. 11/680,584, filed Feb. 28, 2007.
van Riel et al., U.S. Appl. No. 11/680,591, filed Feb. 28, 2007.
van Riel et al., U.S. Appl. No. 11/680,562, filed Feb. 28, 2007.
van Riel et al., U.S. Appl. No. 11/680,576, filed Feb. 28, 2007.

* cited by examiner

*Primary Examiner*—Dieu-Minh Le
(74) *Attorney, Agent, or Firm*—MH2 Technology Law Group LLP

(57) ABSTRACT

Embodiments relate generally to a method of providing a support subscription service. The method includes monitoring at least one a client virtual machine and a respective physical machine supporting the client virtual machine at a site of a customer and detecting an error occurring in at least one of the client virtual machine and the respective physical machine. The method also includes determining a type of error that is occurring and creating a trouble ticket for a vendor associated with the type of error.

17 Claims, 8 Drawing Sheets

METHOD AND SYSTEM FOR AUTOMATIC RESOLUTION AND DISPATCHING SUBSCRIPTION SERVICE

FIELD

This invention relates generally to virtual machines, more particularly to a method and system for automatic resolution and dispatching subscription service.

DESCRIPTION OF THE RELATED ART

The businesses of the Fortune 500 spend large sums of money on their information technology (IT) infrastructure. The investment in IT can improve efficiency and productivity of the business in sales, accounting, financial support, research, etc.

Although these businesses often purchase large amounts of hardware and software they also have the financial wherewithal to hire staff to maintain the IT infrastructure. The IT department of these businesses can assist the users with errors as well as repair any broken hardware. The IT department can also plan for future improvements in the software and hardware. The IT department can also be responsible for training of the users in the IT system, which includes supported software applications and underlying hardware. Most importantly, the IT department can recover the IT infrastructure in the event of a catastrophic event.

Small businesses typically do not have the financial resources to afford an IT department. However, small businesses need the services that an IT department of a Fortune 500 company can provide: technical support in the event of a hardware and/or software failures, training of new employees in the existing system, integrate new technologies (software/hardware), etc.

Since small businesses cannot typically afford a full-time IT staff, a typical small business can hire consultants or go to a computer services company to implement and support their IT infrastructure. However, this is typically an unsatisfactory solution because the consultants and/or services company tend not to be available around the clock or when the problem occurs. Moreover, waiting for the consultant to arrive to diagnose and repair any problem can become lengthy depending on the experience level of the support technician.

BRIEF DESCRIPTION OF TEE DRAWINGS

Various features of the embodiments can be more fully appreciated, as the same become better understood with reference to the following detailed description of the embodiments when considered in connection with the accompanying figures, in which.

DETAILED DESCRIPTION OF EMBODIMENTS

Figure 1:
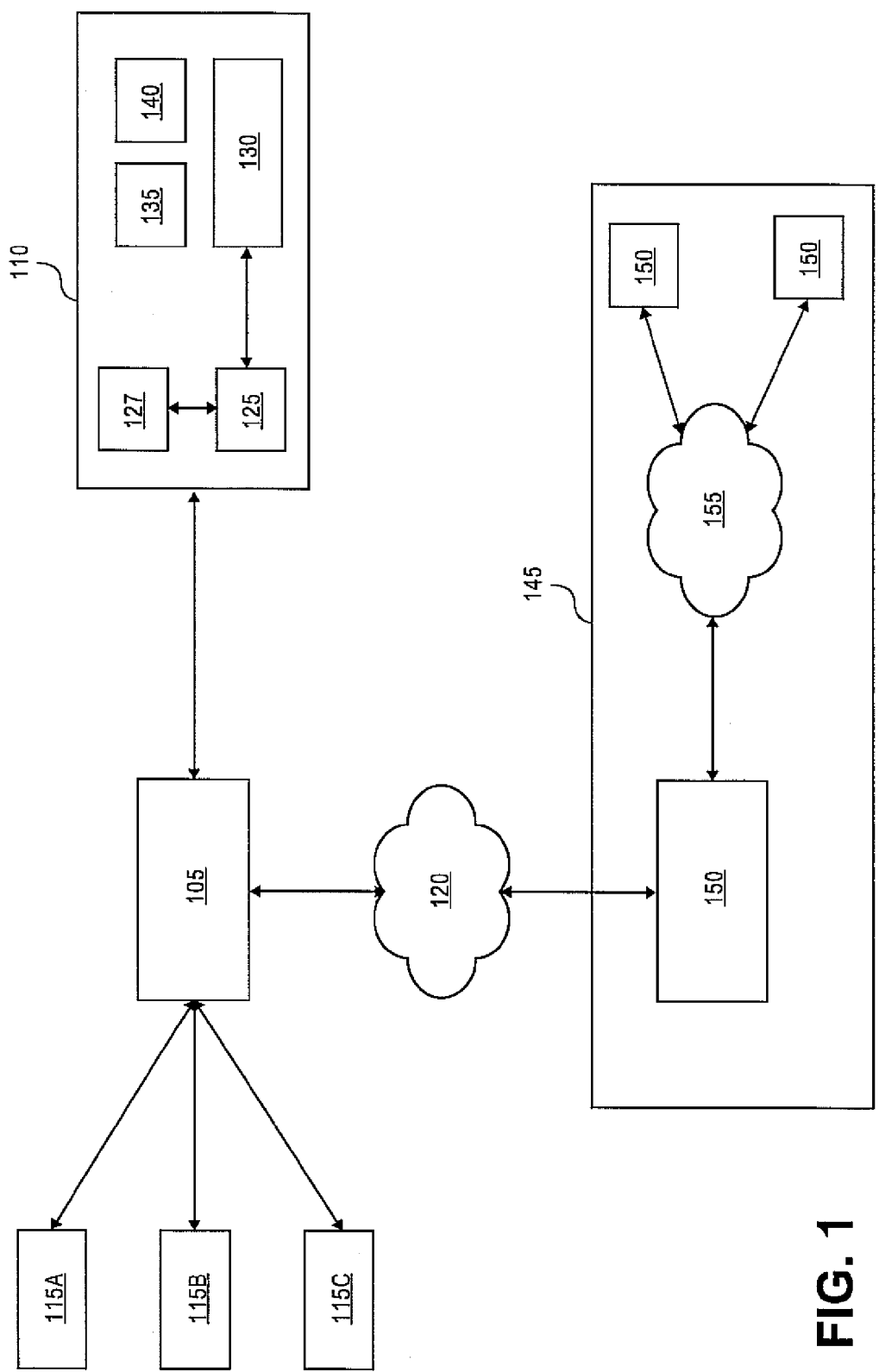
FIG. 1 depicts an exemplary system in accordance with an embodiment.

For simplicity and illustrative purposes, the principles of the present invention are described by referring mainly to exemplary embodiments thereof. However, one of ordinary skill in the art would readily recognize that the same principles are equally applicable to, and can be implemented in, all types of operating systems that support virtualization, and that any such variations do not depart from the true spirit and scope of the present invention. Moreover, in the following detailed description, references are made to the accompanying figures, which illustrate specific embodiments. Electrical, mechanical, logical and structural changes may be made to the embodiments without departing from the spirit and scope of the present invention. The following detailed description is, therefore, not to be taken in a limiting sense and the scope of the present invention is defined by the appended claims and their equivalents.

Embodiments generally relate to methods and systems of providing subscriptions to small businesses through a web-based service portal. More particularly, the service portal can be configured to guide a user such as a small business owner in selecting an appropriate subscription for the services being offered by the service portal. A sample of the services that can be offered by the service portal are continuous availability of a system, remote monitoring for performance, subscription selection, quality assurance, automatic error resolution and dispatching of support, and technical support for small businesses.

The web-based service portal can provide mechanisms for a small business to configure an IT infrastructure based on current or anticipated hardware configurations. More specifically, the service portal can provide a web-based information capture service based on graphical user interfaces, such as web pages, XML pages, etc., to guide the user in configuring a prospective system. Moreover, the information capture service of the service portal can also be configured to provide live technical assistance via instant messaging or chat. Accordingly, the client can speak with a support technician to configure the prospective system. The information capture service can capture the software requirements, hardware requirements and business requirements of the client.

The service portal can transfer the gathered client information to a configuration module. The configuration module can determine a configuration data based on the gathered client information. The configuration data can be used to instantiate virtual machines that will reflect the operating system and software application needs of the client. The configuration data can then be stored in a secure service site.

The configuration data can be forwarded to the client's physical hardware and installed. The installation can be done remotely, a technical support person via portable media or by a user at the client via portable media depending on the selected subscription level. Accordingly, the client can implement their IT infrastructure via virtual machines. The installed virtual machines will be configured to the correct user, each user having the appropriate software and access to the appropriate data.

The configuration data can also be used by certified vendors to test new updates or version of their software. More specifically, a vendor can select the configuration data of several customers (either randomly or by a profile) and instantiate the respective virtual machines from the configuration data of the selected customers. The vendor can then test their new software on actual customer virtual machines without intruding on the actual customers.

The configuration data can further be used to provide continuous availability. When a client experiences a catastrophic event such as a fire or viral attack, the client can contact the service portal to recreate his systems based on his stored configuration data. Depending on the subscription level, the client can have the IT infrastructure of virtual machines instantiated very quickly and made available to the client from the secure service site. The client may have selected a subscription level which includes automatic updates of the client's virtual machines. Snapshots of the virtual disks associated with the virtual machines of the client can be forwarded or retrieved from the site of the client. This client activity data can be combined with the configuration data to recreate the state of the virtual machines at any given time depending on the frequency of the updates. Of course, there is loss of data between the time of the last update and the time of the event.

The use of virtualization provides additional benefits in regard to remote monitoring. As part of virtualization, performance characteristics of the software applications and/or hardware components can be monitored either by polling by or being transmitted to the secure service site depending on the subscribed service. The secure service site can use this monitoring data and compare the data from instantiated test virtual machines based on the state information of the client to determine whether the performance of the client virtual machine falls within performance guidelines. The secure service site can determine possible hardware failures or provide recommendations to improve performance for the customers.

The configuration data can further provide for automatic resolution of bugs or errors and for automatic dispatch to resolve the errors. Depending on the selected subscription service, a client can inform the service portal of an error that is occurring with their virtual machine. The client can also forward the client activity data to the service portal or it can be retrieved by the service portal. Accordingly, the service portal can invoke the secure service site to recreate the virtual machine of the client with the client activity data to accurately represent the error condition. Support technicians can then quickly evaluate the error and determine a recommended course of action without impinging on the client. The support technician can then contact the appropriate vendor for a repair. For example, if the error condition is a result of a bad disk, a message can be generated to the vendor to send a replacement disk to the client. The client can self-install the replacement disk or be notified by the service portal that a technician can install the replacement disk depending on the enrolled subscription service.

FIG. 1 illustrates an exemplary system 100 in accordance with an embodiment. It should be readily apparent to those of ordinary skill in the art that the system 100 depicted in FIG. 1 represents a generalized schematic illustration and that other components may be added or existing components may be removed or modified.

As shown in FIG. 1, the system 100 includes a web-based service portal 105 and a secure service site 110. The service portal 105 can be configured to interface with third party vendors (software vendors 115A, hardware vendors 115B, and service vendors 115C). The service portal 110 can also be configured to be coupled with the Internet 120.

The service portal 105 can be an access point for potential clients to subscribe for computer services based on virtual machines. Virtual machines allow for greater flexibility and a larger number of services because of the isolation between the software and the hardware. A user virtual machine can be created for each user at a client where this virtual machine includes any software application, underlying operating system, and permissions to data. The user virtual machine can then be ported to different hardware platforms and executed thereon as long as the hardware platforms execute an operating system that supports virtualization like Red Hat Linux Release 5 or an operating system executing on a virtualization platform which allows the execution of virtualized operating systems.

The user virtual machine can be created from configuration data. The configuration data includes information such as the type of processor, installed operating system, amount of memory, number of users, network protocols, security goals, etc. This configuration data is derived based on information provided by a client interfacing with the service portal 105. In some embodiments, some of the information can be automatically gleaned from an existing customer system.

The information related to a client existing hardware and/or software or for a prospective system can obtained by the service portal 105 can then be stored and accessed in the secure service site 110. The secure service site 110 can include a management server 125 coupled with a server farm 130. The secure service site 110 also includes a configuration data database 135 and a backup data database 140. The management server 125 can access the databases 135, 140 through a network or direct connections (not shown) as known to those skilled in the art. The management server 125 can also interface with a configuration data generator 127. The configuration data generator 127 can be configured to convert the client information stored in the configuration data database 135 into a configuration data file to be used the management server 125 for instantiating virtual machines.

The management server 125 controls the operation of the secure service site 110. The management server 125 can be configured to receive configuration data, data from the client virtual and physical machines, and backup data from clients and store the received data in the appropriate database. The management server 125 can also be configured to instantiate virtual machines within the machines of the server farm 130 based on configuration data stored on the configuration data database 135. The server farm 130 can be implemented as a collection of servers, workstations, or other similar computing platforms.

The configuration data database 135 can be configured to store and provide access to configuration data of the clients who have subscribed to a subscription service of the service portal 105. The backup data database 140 can store backup data from the clients who have subscribed to a back up service. This database 140 can also store client activity data such as performance data from the clients who have subscribed for a remote monitor and error resolution services. The backup data can be used with the configuration data to create state information for a client. The state information can describe the state of a virtual machine with executing applications and data at the time of the backup. Accordingly, virtual machines can be instantiated at a particular point in time, which can be invaluable for debugging.

The service portal 105 can also be configured to interface with the certified vendors 115A-C. Although FIG. 1 depicts only three types of certified vendors (hardware, software, and services), any type of vendor can interface with the service portal as long as they pass a certification process. A vendor can be certified when their respective product can pass quality assurance tests of the service portal 105. The certified vendors 115A-115C can respectively supply hardware components, software applications and services such as installation and maintenance.

A client 145 can interface with the service portal 105 over the Internet 105. The client 145 can include multiple users 150 coupled over an internal network 155. The internal network 155 can be implemented as a local area network using wired, wireless or combinations thereof protocols such as Ethernet, token ring, etc.

Figure 2:
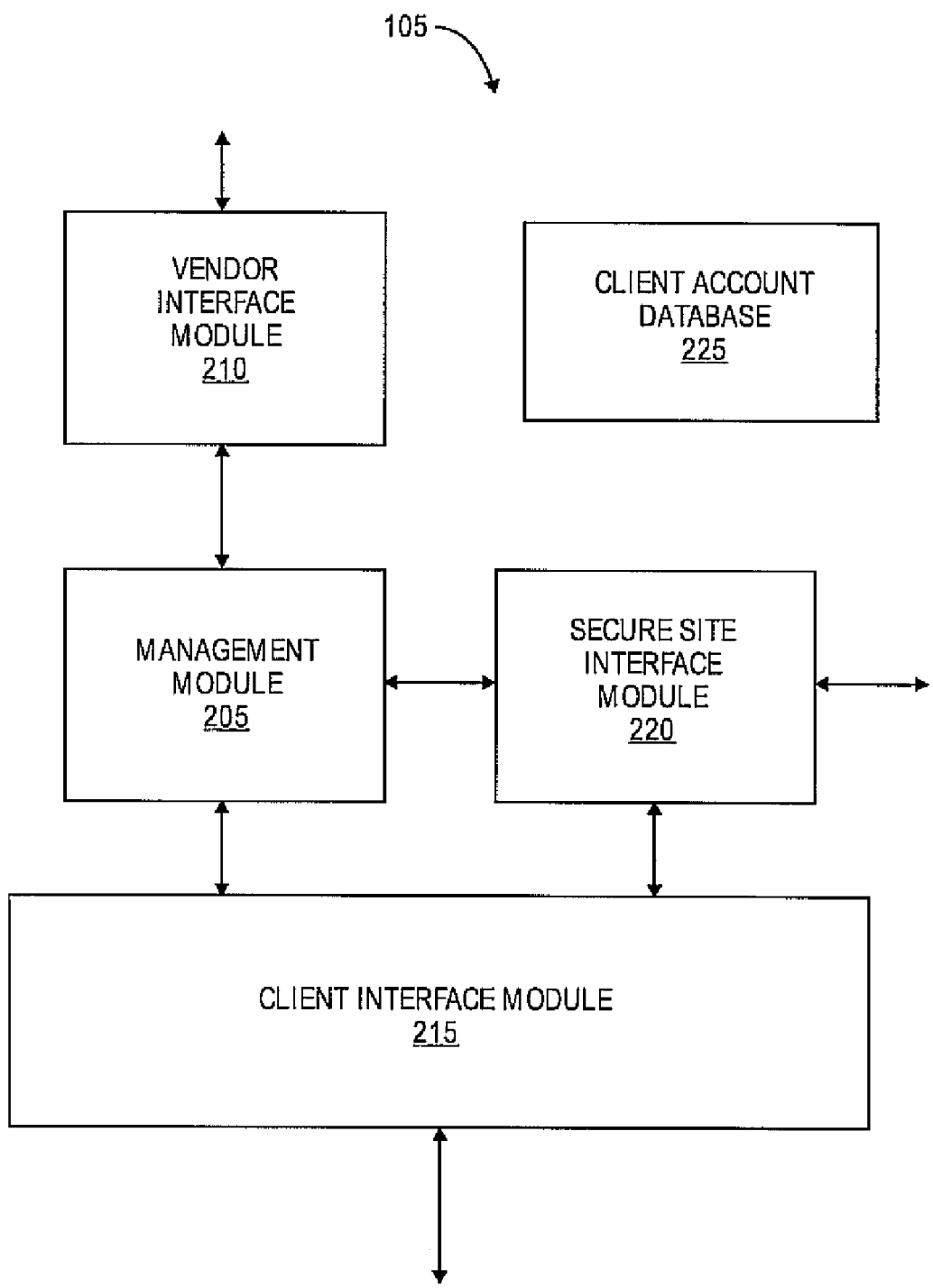
FIG. 2 illustrates an exemplary service portal of the system shown in FIG. 1 in accordance with another embodiment.

As previously described, the service portal 105 provides a variety of services. FIG. 2 provides a more detailed diagram of the service portal 105 in accordance with another embodiment. It should be readily apparent to those of ordinary skill in the art that the service portal depicted in FIG. 2 represents a generalized schematic illustration and that other components may be added or existing components may be removed or modified.

As shown in FIG. 2, the service portal 105 a management module 205 coupled to a vendor interface module 210, a client interface module 215, and a secure site interface module 220. The management module 205 can be configured to manage and execute the program code that provides the functionality of the service portal 105.

The vendor interface module 210 can be configured to provide secure access for certified vendors, such as vendors 115A-115C (shown in FIG. 1) to provide their respective product and/or service to the clients of the service portal 105. The certified vendors can provide information regarding their products and/or services such as performance characteristics, compatibility factors, etc. This information can be stored in a database (not shown), which can be accessed by the management module.

The client interface module 215 can be configured to provide secure access for clients such as client 145 shown in FIG. 1. The client interface module 215 can be configured to provide graphical user interfaces such as web-pages to allow users to order subscription services, configure virtual machine systems, order hardware, services, and/or software application, report errors, request service, etc.

The client interface module 215 can also interface with the secure site interface module 220. However, the secure site interface module 220 can also interface the client interface module 215 through the management module 205. The secure site interface module 220 can be configured for the service portal 105 to securely interface with secure service site 110. The secure site interface module 220 can also be configured to forward the information from the clients to the secure service site 210 for secure storage and continuous availability.

Although a connection is not shown in FIG. 2, the management module 205 can also be coupled a client account database 225. Each account stored in this database is linked to a client of the subscription system 100. Each account can be identified by an account number and contain information such as recent orders, enrolled subscriptions, accounts receivable data, etc.

A feature of that the client account database 225 can provide is a synchronization of subscriptions. For example, a client may license several software packages on a yearly basis which renew on a single date because the software packages were ordered on the same date. A subsequent order of a new software package can be synchronized to the renewal date of the existing software package. For example, if the renewal date of the existing is six months from the purchase of the new software package, the management module 205 can order a six month license of the new software package. Accordingly, at the end of the six months, all the software packages have the same renewal date thus simplifying the administrative duties for the client. Similarly, the synchronization of licenses can also be applied to hardware licenses and/or service contracts.

Figure 3:
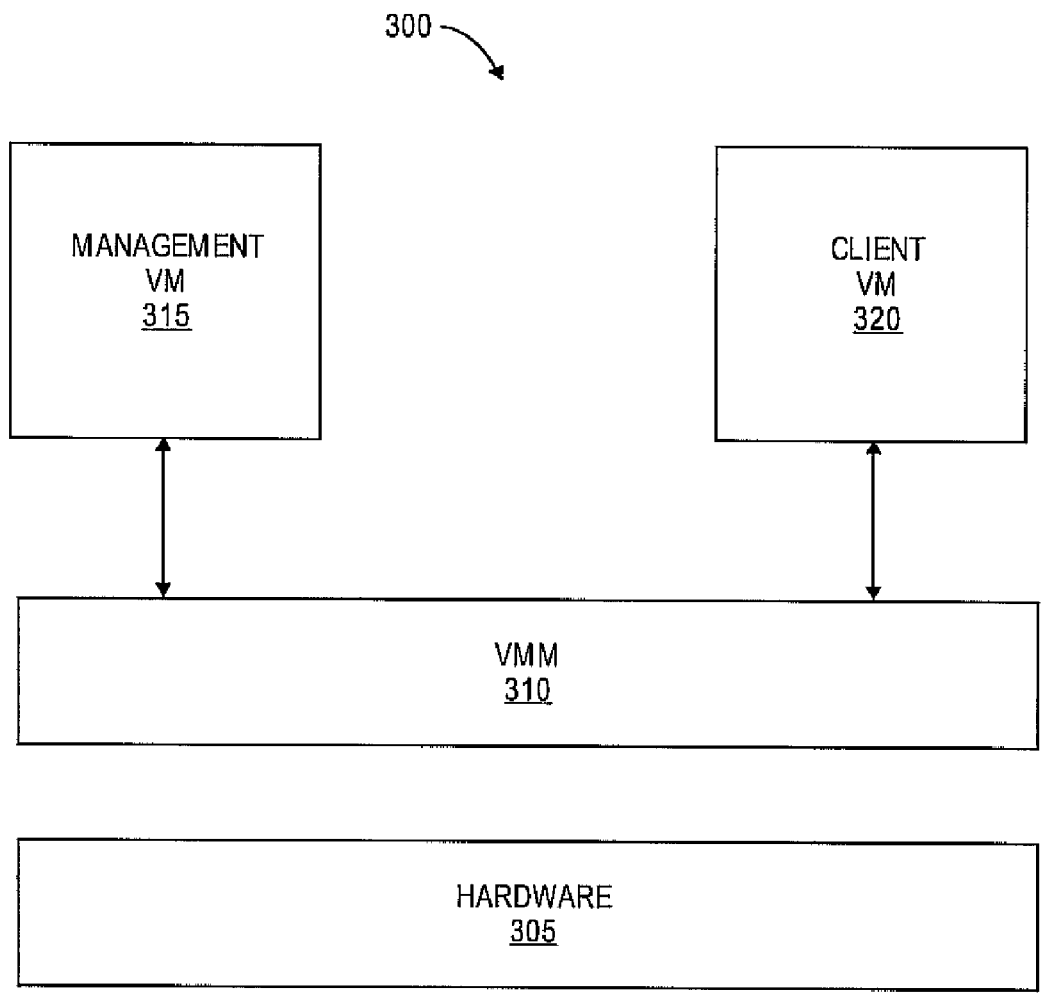
FIG. 3 shows an exemplary virtual machine of the system shown in FIG. 1 in accordance with yet another embodiment.

FIG. 3 depicts an exemplary client machine 300 in accordance with yet another embodiment. As shown in FIG. 3, the virtual machine 300 can be implemented using a general purpose computer and the like. For example, virtual machine 300 can comprise hardware 305 that comprises items, such as a processor, cache, memory, network interface card, etc. Such equipment is well known to those skilled in the art. In addition, virtual machine 300 can include virtualization software. In particular, virtual machine 300 may comprise a virtual machine monitor 310 (labeled as VMM in FIG. 3), a management virtual machine 315, and a client virtual machine 320.

VMM 310 is the software responsible for virtualizing hardware 305 and client machine 300 into logically separate virtual machines, such as virtual machines 315 and 320. Accordingly, this allows a client machine 300 to execute software applications, while at the same being monitored by an external agent, such as secure service site, without interfering with the progress of the client machine 300.

VMM 310 can be a thin layer of software that runs on a host operating system that directly accesses hardware 305. VMM 310 can virtualize various hardware resources of hardware 305 and allow multiple virtual machines, such as virtual machines 315 and 320, to transparently multiplex the resources of hardware 305.

Management virtual machine (VM) 315 tracks the operational status of client VM 320. For example, management VM 315 can directly examine for information, such as memory and register contents, and I/O device flags, to determine the operational status of client VM 320. Management VM 315 may also collect performance characteristics such as disk I/Os, cache hits, temperature, disk utilization, etc. as applications are executed by client VM 320. These results may include information about: all the processes currently running on client VM 320; processes which are currently holding sockets; contents of virtual memory; and contents of the task structure for a particular process; processor utilization; and the like. In addition, management VM 315 may provide certain administrative functions related to managing virtual machine 300, such as logging events, providing remote access, configuration management, and communications. These functions are well known to those skilled in the art.

Client VM 320 may be referred to as the "client" virtual machine because it is the virtual machine that executes the software applications selected by the client. The operating system running inside of client VM 320 and applications running can be specified based on the requirements of the client.

Figure 4:
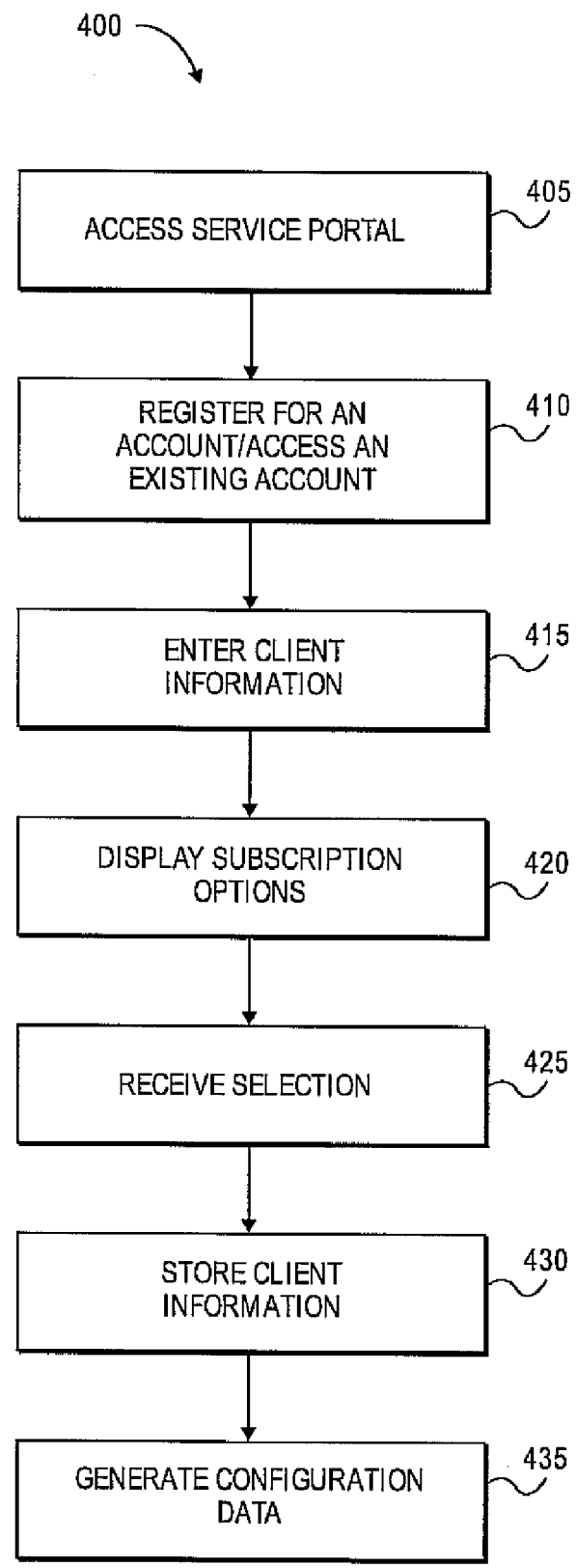
FIG. 4 illustrates a subscription service process flow in accordance with yet another embodiment.

FIG. 4 illustrates a flow process 400 for a Web-based configuration and subscription services for technical support for the system shown in FIG. 1 in accordance with yet another embodiment. It should be readily apparent to those of ordinary skill in the art that the process flow 400 depicted in FIG. 4 represents a generalized schematic illustration and that other steps may be added or existing steps may be removed or modified.

As shown in FIG. 4, in step 405, a client such as client 145 can use the Internet 120 to access the service portal 105. The service portal 105 can be implemented as a secure web-site for access by clients and/or potential clients as known to those skilled in the art.

In step 410, the service portal 105 can display a graphical user interface such as a web-page that requests the user to register for a new account. Alternatively, the web-page can request an existing client to authenticate to his existing account.

In step 415, the service portal 105 can display a series of graphical user interfaces such as web-pages which queries the client 145 to enter information regarding his existing hardware and software configurations, a prospective system or combinations thereof. The client 145 can also enter business requirements as part of the information to design and/or configure the system. The business requirements can be restraints of the business such as client trying to remain as a small business entity under the definition promulgated by the Small Business Administration or a minority-owned business.

The service portal 105 can also provide a link on these series of web-pages that allows the client 145 to contact a technical support person via instant messaging or chat. In some embodiments, a technical support person can support users through video conferencing or using voice over IP technology.

Based on the entered client information, the service portal 105 can generate a series of recommendations or suggestions for the client 145 to implement and use of the client's system. The subscription services can range from configuring a system for self-install to guided installation of a system remotely from the secure site location 110 or having a dispatched technician to install and configure the systems. Other subscription services can also include continuous availability, remote monitoring, error resolution and automatic dispatch, quality assurance testing, etc.

In step 425, the service portal 105 can receive the selection of the client 145. The service portal 105 can forward the client information to the secure site interface module 220 for storage in the configuration data database 135, in step 430.

In step 435, the management server 125 can invoke the configuration data generator 127 to generate a configuration data file based on the client information. Accordingly, the management server 125 is then ready to instantiate a client virtual machine on a machine in the server farm 130 or forward the configuration data file to a client or vendor as directed. Alternatively, the management server 125 can store the generated configuration data file in the configuration data database 135 linked with the client information.

Figure 5:
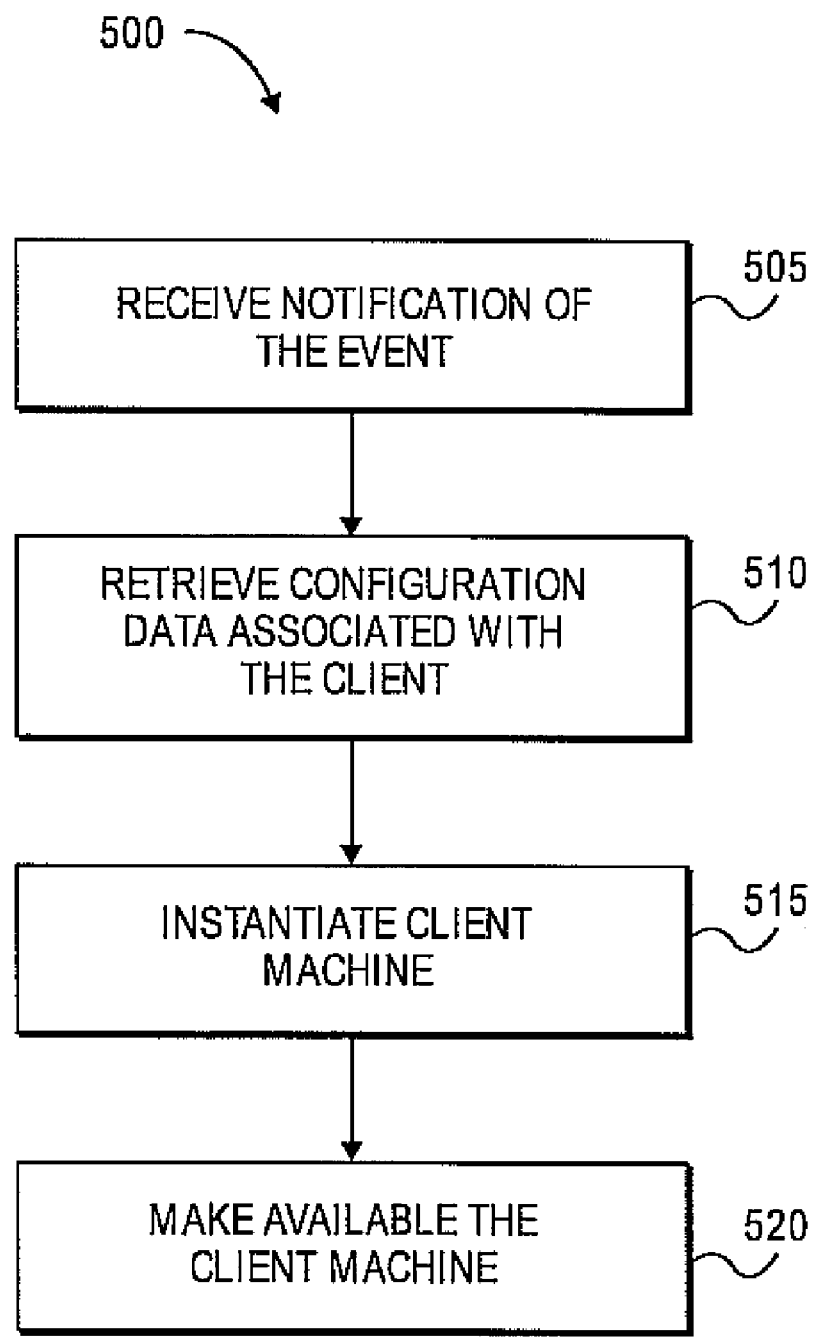
FIG. 5 depicts another exemplary process flow diagram in accordance with yet another embodiment.

FIG. 5 illustrates a flow process 500 for a continuous availability subscription service for technical support for the system 100 shown in FIG. 1 in accordance with yet another embodiment. It should be readily apparent to those of ordinary skill in the art that the process flow 500 depicted in FIG. 5 represents a generalized schematic illustration and that other steps may be added or existing steps may be removed or modified.

The flow process 500 depicted in FIG. 5 is premised on the notion that a client has enrolled for the continuous availability subscription service. As shown in FIG. 5, a client, e.g., client 145, can notify the service portal 105 that an event has occurred which has brought down the client machines at the site of the client, in step 505. The event can be a fire, catastrophic weather event, or malicious activity. The notification can be implemented as a phone call, instant message, an electronic mail, or other communication means.

In step 510, the service portal 105 can notify the management server 125 through the secure site interface module 220. The management server 125 can retrieve the configuration data associated with the client.

In step 515, the management server 125 can select a machine from the server farm 130 to instantiate the client machines based on the retrieved configuration data. Depending on the subscription service, the management server 125 can use the data from the client activity data database 140 to restore the state of the client machines at the point in time when the last update was sent. The configuration data and the client activity data form a state of the client machine. If the client subscribed for a high frequency of updates for the client activity data, the loss of data can be trivial. Accordingly, a client machine can be restored quickly and in a very recent state with minimal data loss.

Subsequently, in step 520, the management server 125 can make available the instantiated client machines to the client. Depending on the subscription service, the client machines can execute within the server farm 130 until the client restores his/her site or the management server 125 can forward the state information of the client machines to an alternative third party site where the client machines can be instantiated.

Figure 6:
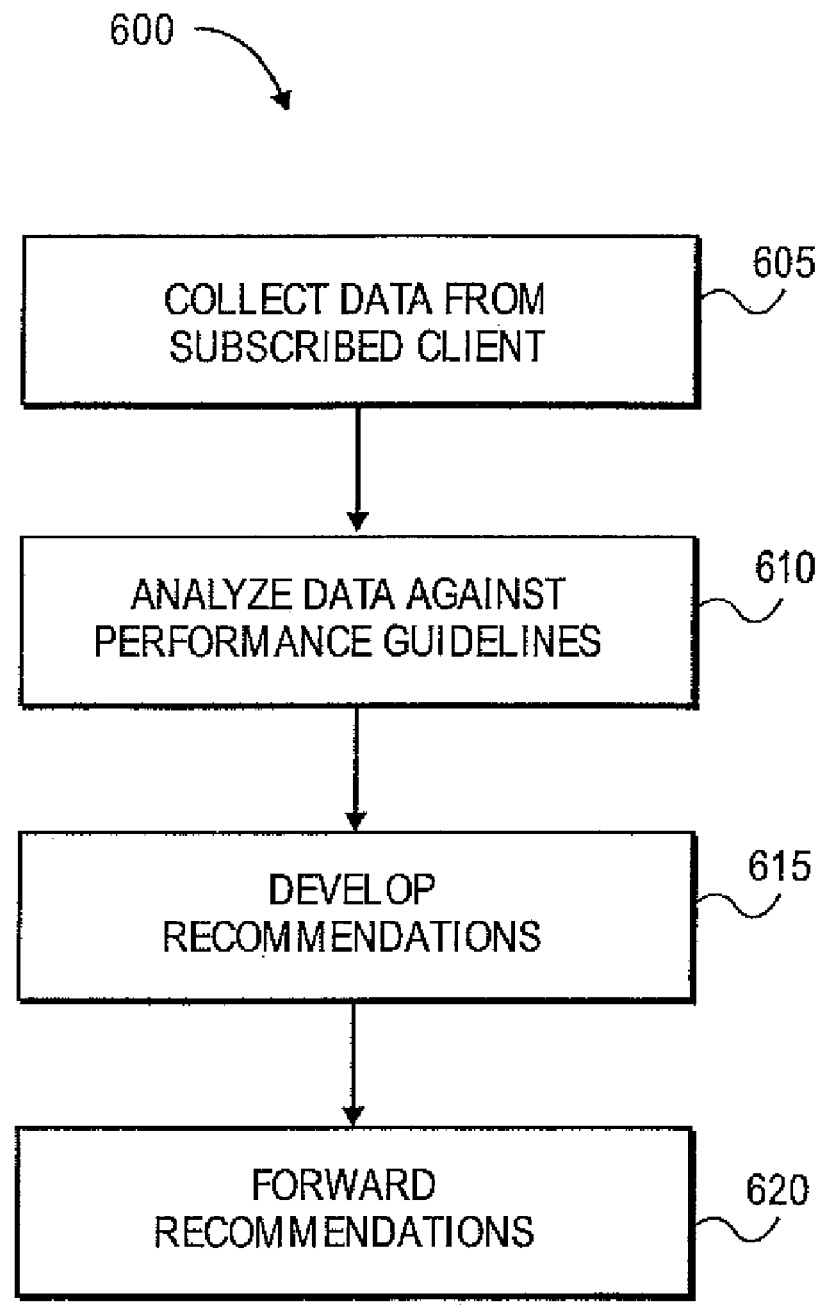
FIG. 6 depicts another exemplary process flow diagram in accordance with yet another embodiment.

FIG. 6 illustrates a flow process 600 for a remote performance monitoring subscription service for technical support for the system 100 shown in FIG. 1 in accordance with yet another embodiment. It should be readily apparent to those of ordinary skill in the art that the process flow 600 depicted in FIG. 6 represents a generalized schematic illustration and that other steps may be added or existing steps may be removed or modified.

As shown in FIG. 6, in step 605, data is collected from the client machines of a subscribed client of this subscription service. The data includes hardware data such as temperature, fan operation, BIOS operations, network reliability, etc. The software data can include as memory utilizations, disk I/Os, disk utilizations, application response latency, etc. The collection of the hardware and software data is a result of the VMM 310 can retrieve data related to the client virtual machine 320 and the hardware 305. Moreover, this data can be polled from the client machines or they can be forwarded by the client machines.

In step 610, the management server 125 can be configured to analyze the received data against performance guidelines. Subsequently, the management server 125 can develop recommendations for the client, in step 615. For example, the management server 125 can determine that one of the disks is rapidly being filled with data and/or applications. As a result, the management server 125 can recommend the client to buy an additional disk drive.

The management server 125 can also detect a failing part by the analysis against the performance guidelines. For example, a fan can be failing due to the increase temperature within the enclosure. The management server 125 can alert the client with a recommendation of repairing the failing hardware component.

In step 620, the recommendations are forwarded to the client. The recommendation can also include a link to the service portal 105 to start a process where the service portal 105 can indicate a certified vendor to forward a hardware component or software component to the site of the client for a self-repair or with a technician depending on the subscribed service.

Figure 7:
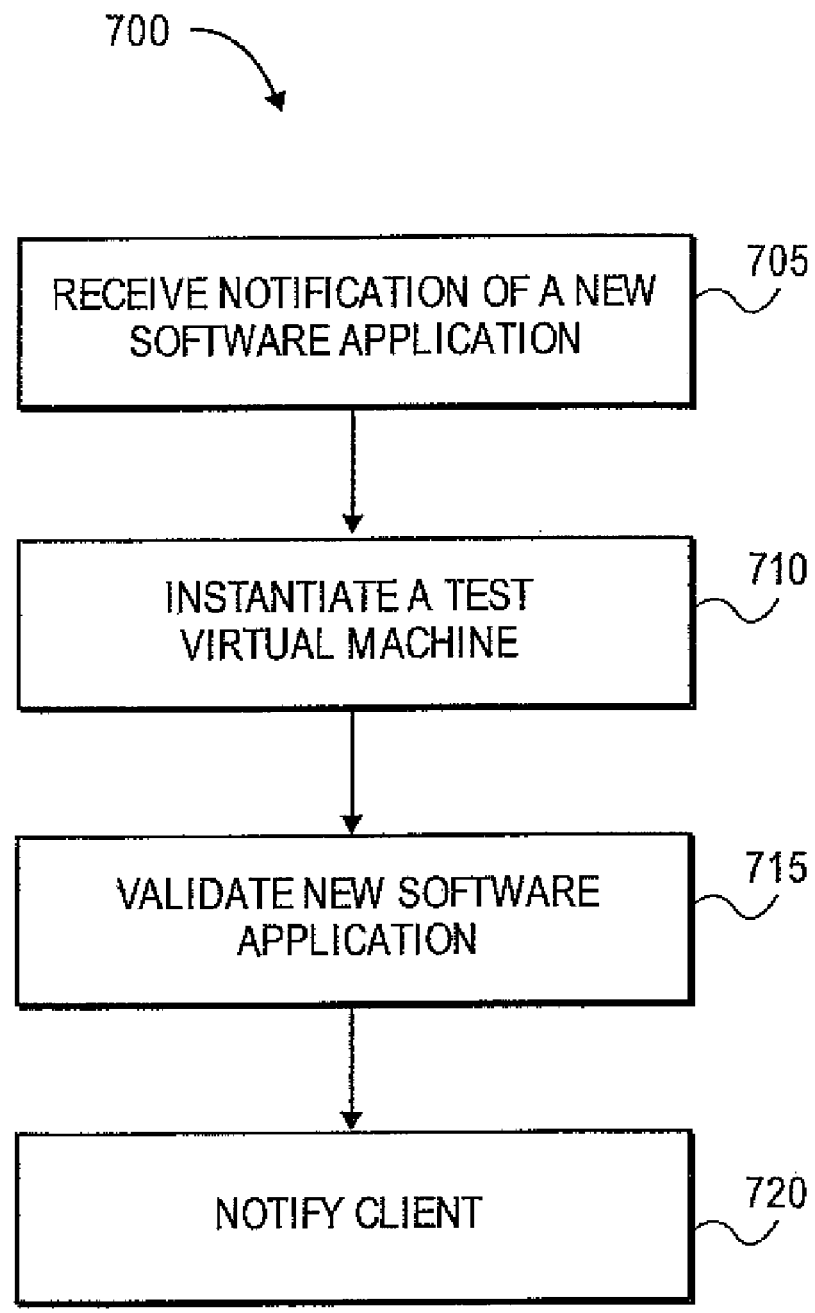
FIG. 7 depicts another exemplary process flow diagram in accordance with yet another embodiment.

FIG. 7 illustrates a flow process 700 for a quality assurance subscription service for technical support for the system 100 shown in FIG. 1 in accordance with yet another embodiment. It should be readily apparent to those of ordinary skill in the art that the process flow 700 depicted in FIG. 7 represents a generalized schematic illustration and that other steps may be added or existing steps may be removed or modified.

As shown in FIG. 7, the service portal 105 can receive notification of a new software application from a certified vendor. The new software application can be a new application, an update to an existing software program or an application that a client does not currently own. The service portal 105 can also be forwarded a copy of the new software application to be used by the management server 125.

In step 710, the service portal 105 can notify the management server 105 to instantiate a test virtual machine based on the configuration data of the client stored in the configuration data database 305 through the secure site interface module 220. The management server 125 can make available the client test virtual machine for the requesting certified vendor.

In step 715, the management server 125 can test the new software application on the client test virtual machine using predetermined quality assurance tests known to those skilled in the art. If the new software application passes these tests, the client can be notified of the new software application and that it has been tested to be fully functional in the client's local configuration. In other embodiments, the management server 125 can be configured to provide secure access to the vendor to test his new software application on the instantiated test virtual machines. Depending on the subscription service, the new software application can then be pushed to the client or the client can download the new software application at the client's convenience.

A variation of this testing is vendor quality assurance testing. More particularly, a certified software vendor can request to test his software against several customers of the service portal. The service portal 105 can invoke the management server 125 to retrieve configuration data of selected customers (randomly, by profile, etc.) to instantiate test virtual machines. The management server 125 then makes these test virtual machines to the certified software vendor over a secure connection for testing of the software application. Accordingly, assuming all the tests were passed, the certified software vendor can claim full functionality of his product.

Figure 8:
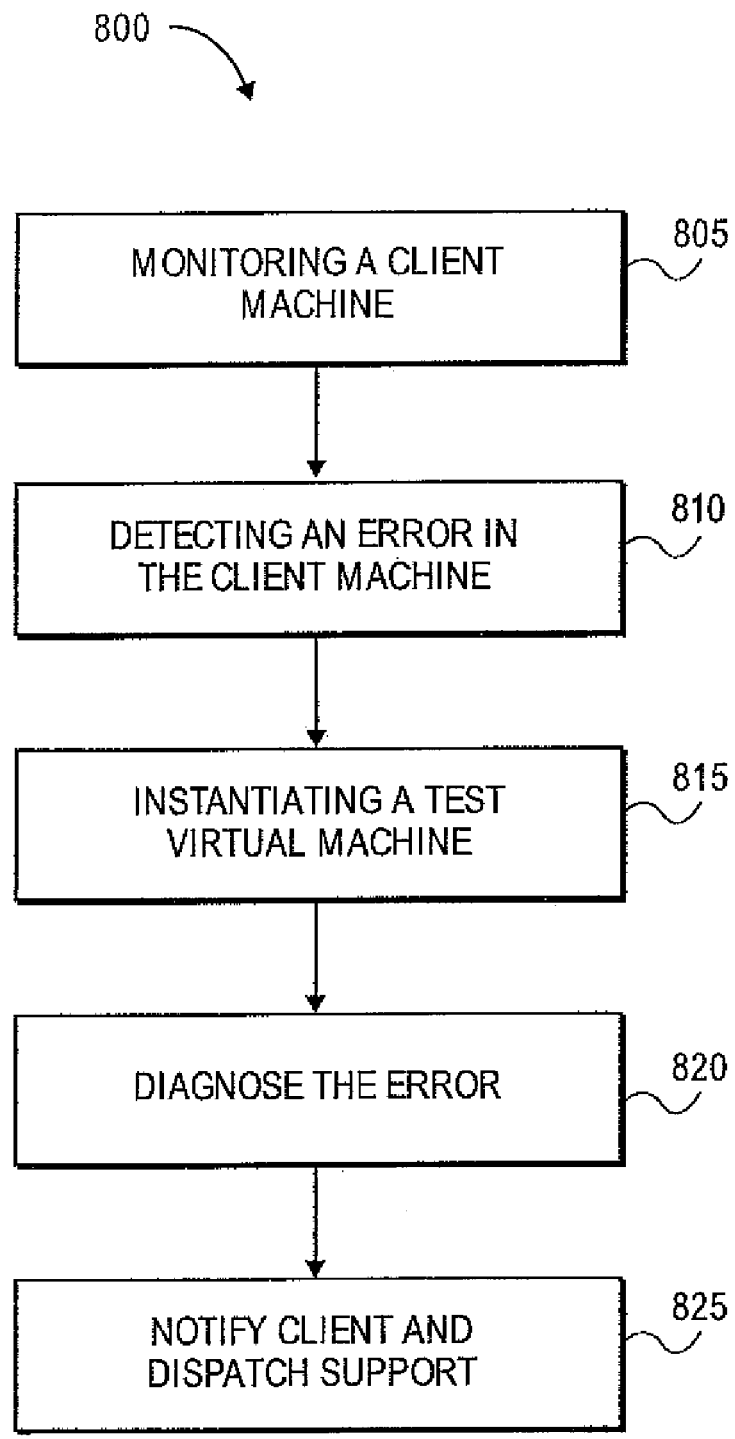
FIG. 8 depicts another exemplary process flow diagram in accordance with yet another embodiment.

FIG. 8 illustrates a flow process 800 for an automatic resolution and dispatching of support subscription service for the system 100 shown in FIG. 1 in accordance with yet another embodiment. It should be readily apparent to those of ordinary skill in the art that the process flow 800 depicted in FIG. 8 represents a generalized schematic illustration and that other steps may be added or existing steps may be removed or modified.

As shown in FIG. 8, the management server 125 can be configured to monitor a client machine of a subscribing client. The management server 125 can monitor the client virtual machine, the underlying hardware such as hardware 305, or both depending on the level of the subscription service.

In step 810, the management server 125 detects an error within the client virtual machine. The management server 125 can take a snapshot of the client virtual machine which captures the state of the client virtual machine.

In step 815, the management server 125 can instantiate a test virtual machine based on the configuration data of the subscribing client on a selected server on the server farm 130. The management server 125 can use the captured state information from the client machine and to create a state in the test virtual machine that mirrors the client machine.

In step 820, the management server 125 can run debug programs on the test virtual machine or a technician may review the current state of the test virtual machine to determine an error. The error can be a software error, a hardware error or an operating system error.

In step 825, the management server 125 can notify the client of the error in a message. The message can be electronic mail message that could contain links for the resolutions of the error. For example, for the specific error determined, the certified vendor supplying the failing component (hardware, software, operating system) can be notified of the error and send a replacement part to the client for a self-repair depending on the subscribed service. Another example is that the replacement component will be forwarded to the site of the client where a support technician will install the replacement part.

Certain embodiments may be performed as a computer program. The computer program may exist in a variety of forms both active and inactive. For example, the computer program can exist as software program(s) comprised of program instructions in source code, object code, executable code or other formats; firmware program(s); or hardware description language (HDL) files. Any of the above can be embodied on a computer readable medium, which include storage devices and signals, in compressed or uncompressed form. Exemplary computer readable storage devices include conventional computer system RAM (random access memory), ROM (read-only memory), EPROM (erasable, programmable ROM), EEPROM (electrically erasable, programmable ROM), and magnetic or optical disks or tapes. Exemplary computer readable signals, whether modulated using a carrier or not, are signals that a computer system hosting or running the present invention can be configured to access, including signals downloaded through the Internet or other networks. Concrete examples of the foregoing include distribution of executable software program(s) of the computer program on a CD-ROM or via Internet download. In a sense, the Internet itself, as an abstract entity, is a computer readable medium. The same is true of computer networks in general.

While the invention has been described with reference to the exemplary embodiments thereof, those skilled in the art will be able to make various modifications to the described embodiments without departing from the true spirit and scope. The terms and descriptions used herein are set forth by way of illustration only and are not meant as limitations. In particular, although the method has been described by examples, the steps of the method may be performed in a different order than illustrated or simultaneously. Those skilled in the art will recognize that these and other variations are possible within the spirit and scope as defined in the following claims and their equivalents.

What is claimed is:

1. A method of providing a support subscription service, the method comprising:
   monitoring at least one of a client virtual machine and a physical machine supporting the client virtual machine at a site of a customer;
   detecting an error occurring in the at least one of the client virtual machine and the physical machine;
   determining a type of the error that is occurring;
   determining a vendor based on the error type;
   retrieving configuration data of the at least one of the client virtual machine and the physical machine;
   instantiating a test virtual machine based on the configuration data; and
   forwarding the test virtual machine to the vendor for troubleshooting the error.

2. The method of claim 1, wherein the step of instantiating a test virtual machine further comprises:
   diagnosing the error against the test virtual machine.

3. The method of claim 2, further comprising:
   maintaining a list of vendors that support the customer at a service portal; and
   selecting the vendor associated with the error from the list of vendors.

4. The method of claim 1, further comprising determining whether the error is a software error, an operating system error, or a hardware error.

5. The method of claim 4, further comprising sending a message to the vendor for replacement equipment for the customer to self-repair in response to the error being a hardware error.

6. The method of claim 1, further comprising dispatching a support technician to the site of the customer.

7. The method of claim 6, further comprising transmitting a message to the vendor to send a replacement part for the support technician to repair the hardware error in response to the error being a hardware error.

8. The method of claim 1, further comprising dispatching a request to the customer for authorization to send a support technician to resolve the error.

9. A system for providing a support subscription service for a customer, the system comprising:
   a service portal configured to provide subscription services; and
   a secure location configured to store state information of a customer entered through the service portal, wherein the service portal can be configured to invoke the secure location to monitor at least one of a client virtual machine and a physical machine supporting the client virtual machine at a site of a customer; to detect an error occurring in the at least one of the client virtual machine and the physical machine; to determine a type of the error that is occurring; to determine a vendor based on the error type: to retrieve configuration data of the at least one of the client virtual machine and the physical machine; to instantiate a test virtual machine based on the configuration data; and to forward the test virtual machine to the vendor for troubleshooting the error.

10. The system of claim 9, wherein the secure location is further configured to diagnose the error against the test virtual machine.

11. The system of claim 10, wherein the secure location is configured to maintain a list of vendors that support the customer at a service portal and to select the vendor associated with the error from the list of vendors.

12. The system of claim 9, wherein the secure location is configured to determine whether the error is a software error, an operating system error, or a hardware error.

13. The system of claim 12, wherein the secure location is configured to send a message to the vendor for replacement equipment for the customer to self-repair in response to the error being a hardware error.

14. The system of claim 9, wherein the secure location is configured to dispatch a support technician to the site of the customer.

15. The system of claim 14, wherein the secure location is configured to transmit a message to the vendor to send a replacement part for the support technician to repair the hardware error in response to the error being a hardware error.

16. The system of claim 9, wherein the secure location is further configured to dispatch a request to the customer for authorization to send a support technician to resolve the error.

17. The system of claim 9, wherein the secure location is further configured to forward configuration data of the test virtual machine to the vendor.

* * * * *